Jan. 1, 1935. H. N. WADE 1,986,653
COOLING TOWER
Filed March 24, 1933
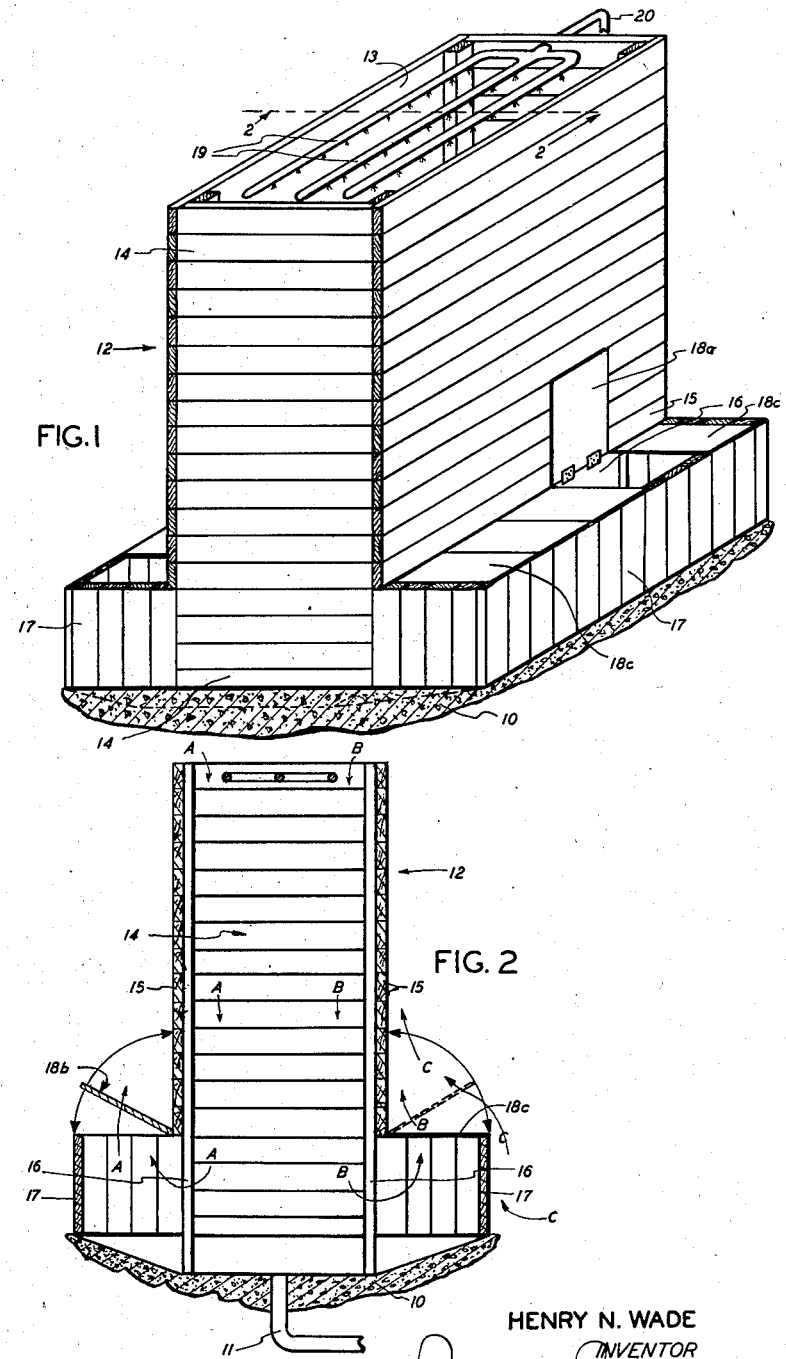
HENRY N. WADE
INVENTOR
ATTORNEY Patented Jan. 1, 1935

1,986,653

UNITED STATES PATENT OFFICE 1,986,653

COOLING TOWER

Henry N. Wade, Los Angeles, Calif., assignor to Parkhill-Wade, Incorporated, Los Angeles, Calif., a corporation of California Application March 24, 1933, Serial No. 662,635

2 Claims. (Cl. 261—109)

My invention pertains to the class of water cooling devices in which sensible heat is converted into latent heat of evaporation, by intimate subdivision of the water and contact of the minute particles with a current of air.

An object of my invention is to provide a cooling tower in which the normal direction of air flow is downward but which will permit an upward flow of air under certain atmospheric conditions.

An object of my invention is to provide a cooling tower in which the flow of air under normal operating conditions is entirely unimpeded.

An object of my invention is to provide a cooling tower having controllable means for impeding and regulating the flow of air under abnormal operating conditions.

An object of my invention is to provide a cooling tower having means for preventing any substantial loss of water other than that due to vaporization.

Other objects and advantages of my invention will become evident on inspection of the attached drawing and the following description thereof, in which Figure 1 is an isometric projection of the device, which will be understood to be wholly diagrammatic, and Figure 2 is a cross section and internal elevation as on the line 2—2 of Figure 1.

Referring to the drawing, 10 indicates a catch basin of concrete or other suitable material, provided with an outflow pipe 11. Over this basin I erect a tower 12, usually of wood but which may be a rustless metal in whole or in part if preferred. This tower is substantially open at the top as indicated at 13.

The ends of the tower are substantially closed down to ground level or to the rim of the basin, as indicated by the planking shown at 14, and the sides are also substantially closed from the top to a level which is materially above ground level, leaving an opening parallel with the rim of the basin the entire length of the tower and on each side. The planking on the sides of the tower is indicated at 15. A small portion of one of these openings appears at 16 in Figure 1 and the full height of the openings is indicated by the same number in Figure 2. The preferred height of these openings is such that the combined area of the two openings is approximately equal to the free internal area of the tower 12.

Surrounding the aforesaid openings and on the rim of the catch basin I erect an enclosure 17, which should be substantially water tight and may be of the same material as the tower proper. The height of the enclosure should be not less than that of the openings 16 and in locations where high winds are prevalent it may desirably be somewhat higher. The distance of the enclosure from the sides of the tower should be approximately equal to the height of openings 16: if there is any difference the distance should be greater, not less than the height of the openings.

For the purpose of providing a highly desirable though not strictly necessary control of the amount of air flowing through the tower, I prefer to span the horizontal opening between the top of the enclosure and the sides of the tower with a plurality of trap doors, one of which is indicated at 18a in an open position, one at 18b in a partly closed position, and several at 18c in a closed position. These traps may be hinged as shown and provided with any well known means for raising, lowering and retaining in an open position, and they may be attached either to the side of the tower 12 or to the top of the enclosure 17.

In the upper portion of the tower and preferably near its top I place a series of spraying devices 19 supplied with warm water under pressure by means of a pipe 20 and a pumping means not shown. These sprays may be of any preferred and known type, but they should not only finely subdivide the water but should also direct it downwardly and with some force.

With the provisions above described a number of useful and valuable results may be produced by regulating the controls in the following manner.

A—When there is no wind, all of the trap doors are fully opened, allowing the unimpeded passage of air through the apparatus. The downwardly directed water sprays then induce a downward air flow through the tower and an upward movement through the enclosures, as indicated by the arrows A—A at the left side of Fig. 2.

A much more rapid movement of air through the tower than is possible where the flow is due solely to the heating of the air column by the water may thus be produced. It is well known that the present types of tower, in which air movement is dependent upon the wind, fall to an extremely low efficiency of cooling during periods of dead calm, as they then depend solely on the displacement of a slightly warmed air column by colder air, this displacement being resisted by the tendency of the falling water drops to force the column in the opposite direction.

B—When there is any material wind velocity the dual usefulness of the enclosure 17 becomes evident. The spray which may be carried through the openings 16 is directed against the inside of the enclosing wall, which acts as an efficient mist extractor, returning the spray to the catch basin and permitting only the finest spindrift to leave the tower.

As the enclosing wall to windward of the tower breaks the force of the wind and deflects it upwardly, this tower may be operating with the trap doors wide open at such wind velocities as would cause large quantities of water to be lost from the ordinary ventilated or "louvre" type of tower. Under the above described conditions the courses of the air currents are as indicated by the arrows A—A, B—B and C—C of Figure 2, the latter indicating wind movement. The effectiveness of the aspiration indicated by the arrows B—B is increased by increasing the relative height of the enclosing walls 17.

C—When the wind increases to a velocity sufficient to prevent the enclosure 17 from returning all the spray to the catch basin, the trap doors 18 may be utilized to reduce its effects. A part of the total number of doors either to windward or to leeward of the tower may be entirely closed, or all of the doors to leeward may be partially closed, thus reducing the effective area of the apparatus. When the wind reaches the velocity of a gale, a condition under which the ordinary types of tower are often completely deprived of water, the traps on the windward side may be entirely closed or (provided they are suspended from the tower as shown in the figures) they may be retained in a slightly opened position on the windward side and closed on the opposite side, thus temporarily reversing the direction of air flow through the tower.

D—Under conditions of very low air temperature, when towers of conventional construction often become inoperative by reason of accumulation of ice, the trap doors may be closed to any desired extent, in either of the manners above described, and a temperature above the freezing point thus maintained within the tower and in the catch basin.

In brief, by providing for a normal downward movement of air, which may be reversed at will; by providing a solid, wind-excluding wall for the tower proper; by providing a spray-retaining and wind-deflecting wall or enclosure around the lower air openings and by providing means for controlling the effective area and the direction of such openings, I am enabled to so control the air currents as to produce the most desirable operating conditions under all external conditions of wind velocity and air temperature. These improvements I desire to claim as broadly as the state of the art will permit.

While I have shown and described this apparatus in a conventional and preferred form, as a rectangle having greater length than width and with the air openings and enclosing walls located on both of the longer sides, it will be understood that this showing is illustrative only and that the apparatus may be of any form and dimensions; that the air openings and the optional enclosing walls may be on one or more sides, and that the doors 18 may be hinged to swing in either direction.

It is common practice to utilize towers of this general character for the direct cooling of hot gases or vapors in pipe coils or cooling sections placed in the lower portion of the tower. My improved tower is fully adapted to such use but as this is no part of the present invention I do not describe or show such cooling means. It should be stated, however, that when such cooling means are placed in my improved tower they should be located substantially below the air openings 16 so as not to obstruct the free passage of air through the tower.

The operating method here described, of inducing a downward flow of air through a wind-excluding tower, is incompatible with the use of drip trays in the tower, both because such trays too much obstruct the passage of a downward air current through the tower and because a mere drip of water does not supply the energy required to induce the downward flow. The water must be projected downwardly, as fine streams or sprays, with considerable force.

In the attached claims, when I make use of the term "wind-excluding" as referring to the tower structure and the walls enclosing the openings, I would be understood to mean such degree of wind exclusion as would be produced, for example, by the use of ordinary boards, laid flat and edge to edge, and not necessarily to such degree of tightness as would follow the use of tongue and groove lumber or metallic sheets.

I claim as my invention:

1. The method of cooling water which comprises: downwardly projecting supplies of said water within an unimpeded enclosure of space and thereby inducing downward movement of a column of atmospheric air through said enclosure and cooling said water by evaporation of a portion thereof; separating said water from said air; discharging said air column from the lower portion of said enclosure into the atmosphere under such conditions that the return of said column to said enclosure is substantially prevented; substantially excluding extraneous air currents from interference with said downwardly moving air column, and so regulating said downward flow of air as to maintain a substantially constant desired temperature within said space under varying atmospheric conditions.

2. A water-cooling tower, comprising: a vertical, hollow, upwardly open and substantially wind excluding structure of rectangular form, two opposed sides of said structure being provided in their lower portions with openings for the passage of air; substantially wind-excluding walls enclosing spaces surrounding said lower openings, said spaces being upwardly open; means for partially or entirely closing said last named upward openings to regulate or prevent the passage of air therethrough; means adjacent the upper open end of said structure for subdividing and downwardly projecting supplies of water to be cooled, and a catch basin beneath said structure and the spaces enclosed by said walls.

HENRY N. WADE.